US009460745B1

(12) United States Patent
Flechsig et al.

(10) Patent No.: US 9,460,745 B1
(45) Date of Patent: Oct. 4, 2016

(54) PREHEATING A HARD DISK DRIVE HEAD SLIDER FOR HEAD SWITCH SEEK

(71) Applicant: HGST Netherlands B.V., Amsterdam (NL)

(72) Inventors: Karl A. Flechsig, Los Gatos, CA (US); Bernd Lamberts, Cupertino, CA (US); Craig K. Yanagisawa, Palo Alto, CA (US)

(73) Assignee: HGST Netherlands B.V., Amsterdam (NL)

(*) Notice: Subject to any disclaimer, the term of this patent is extended or adjusted under 35 U.S.C. 154(b) by 0 days.

(21) Appl. No.: 14/869,927

(22) Filed: Sep. 29, 2015

(51) Int. Cl.
G11B 21/02 (2006.01)
G11B 5/60 (2006.01)
G11B 5/55 (2006.01)

(52) U.S. Cl.
CPC ............. *G11B 5/607* (2013.01); *G11B 5/5547* (2013.01)

(58) Field of Classification Search
None
See application file for complete search history.

(56) References Cited

U.S. PATENT DOCUMENTS

| 7,088,545 | B1 | 8/2006 | Singh et al. |
| 7,330,323 | B1 | 2/2008 | Singh et al. |
| 7,375,914 | B1 | 5/2008 | Dieron et al. |
| 7,430,090 | B2 | 9/2008 | Oyamada et al. |
| 7,630,162 | B2 * | 12/2009 | Zhao ..................... G11B 5/6005 360/31 |
| 7,969,681 | B2 | 6/2011 | Satoh et al. |
| 8,320,069 | B1 * | 11/2012 | Knigge ................. G11B 5/6011 360/31 |
| 8,456,980 | B1 | 6/2013 | Thayamballi |
| 8,947,822 | B1 * | 2/2015 | Rice ..................... G11B 5/6064 360/75 |
| 2014/0029396 | A1 | 1/2014 | Rausch et al. |

OTHER PUBLICATIONS

HGST, a Western Digital company, Thermal Fly-height Control (TFC) Technology in HGST Hard Disk Drives, Whitepaper, Nov. 2007, 3 pages, HGST, a Western Digital company, US, downloaded from: http://www.hgst. com/tech/techlib.nsf/techdocs/ 98EE13311A54CAC886257171005E0F16/$file/TFC_ whitepaper041807.pdf.

* cited by examiner

Primary Examiner — K. Wong
(74) Attorney, Agent, or Firm — John D. Henkhaus

(57) ABSTRACT

Managing the flying height of a read-write head slider, such as in the context of a short or head switch seek, involves pre-heating the switched-to head while the active head is still performing a data read or write operation. Thus, both the active head and the switched-to head may be heated simultaneously, and once the switched-to head is switched to an active state upon the active head completing its corresponding operation, the switched-to head can immediately begin its operation with minimal or no further delay.

18 Claims, 3 Drawing Sheets

PREHEATING A HARD DISK DRIVE HEAD SLIDER FOR HEAD SWITCH SEEK

FIELD OF EMBODIMENTS

Embodiments of the invention may relate generally to hard disk drives and more particularly to an approach to managing the flying height of a read-write head slider.

BACKGROUND

A hard-disk drive (HDD) is a non-volatile storage device that is housed in a protective enclosure and stores digitally encoded data on at least one circular disk having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head uses a magnetic field to read data from and write data to the surface of a magnetic-recording disk. A write head makes use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

Increasing areal density, a measure of the quantity of information bits that can be stored on a given area of disk surface, is one of the ever-present goals of HDD design evolution. As areal density increases, the read-write head generally needs to fly closer and closer to the disk surface. Flying height control systems are often used to fly the read-write head as close as possible to the magnetic-recording disk for effective operation of the head. For example, a heater element located in the head slider is typically used for thermal flying height control (TFC) which, for example, may be controlled by a preamplifier associated with the hard disk drive head stack assembly (HSA). By applying current to the heater, the surrounding slider material is caused to expand in response to the heat, which causes a bulge in the slider toward the disk thus reducing the flying height of the read-write head. TFC may be used to compensate for flying height fluctuations due to temperature, altitude, disk location, type of operation, and the like. Particularly during read operations, the heater causes the reader to be closer to the disk to increase the signal strength of the read-back signal read from the magnetic disk. Additionally, the heater may be used to cause the writer to be closer to the disk to increase the robustness of the magnetization written to the disk. Regardless of the operation for which TFC power may be applied, the TFC heater element has an associated time constant over which the desired slider bulge is generated, which depends on the head design, manufacturing tolerances, etc.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are generally directed toward an approach to managing the flying height of a read-write head slider. In the context of a head switch seek, in which a hard disk drive (HDD) switches from operation of one head slider to another head slider, one approach involves pre-heating the switched-to head while the active head is still performing a read or write operation. Thus, both the active head and the switched-to head may be heated simultaneously, and once the switched-to head is switched to an active state upon the active head completing its corresponding operation, the switched-to head can immediately begin its operation effectively without further delay. Essentially, the delay associated with the TFC heater element time constant is averted or minimized.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to managing the flying height of a read-write head slider are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Operating Context

Embodiments may be used in the context of managing the flying height of a read-write head slider within a hard disk drive (HDD) storage device. Thus, in accordance with an embodiment, a plan view illustrating an HDD 100 is shown in FIG. 1 to illustrate an exemplary operating context.

Figure 1:
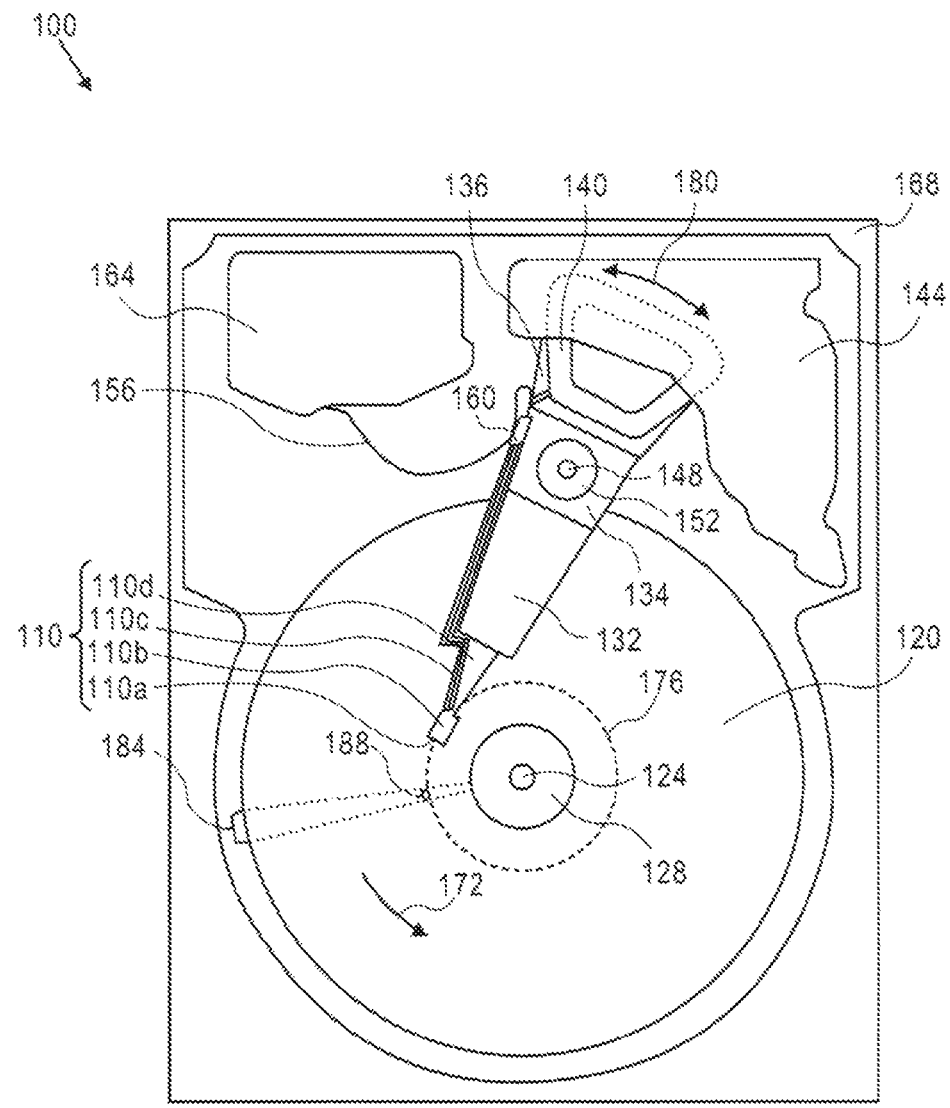
FIG. 1 is a plan view illustrating a hard disk drive (HDD), according to an embodiment.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110d attached to the lead suspension 110c. The HDD 100 also includes at least one magnetic-recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110, to access portions of the medium 120, being mounted on a pivot-shaft 148 with an interposed pivot bearing assembly 152. In the case of an HDD having multiple disks, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM coil) to which the actuator arm is coupled, may be collectively referred to as a head stack assembly (HSA). An HSA may, however, include more or fewer components than those described. For example, an HSA may refer to an assembly that further includes electrical interconnection components, a preamplifier, etc. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are provided by a flexible interconnect cable 156 ("flex cable"). Interconnection between the flex cable 156 and the head 110a may be provided by an arm-electronics (AE) module 160, which may have an on-board pre-amplifier as well as other read-channel and write-channel electronic components (collectively, "data channel"). The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a base, in conjunction with an HDD cover provides a sealed, protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector"), for example, sectored track portion 188. Each sectored track portion 188 may be composed of recorded data and a header containing a servo-burst-signal pattern ("servo burst"), for example, an ABCD-servo-burst-signal pattern, which is information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass a data storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differs, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

It is common for a hard disk drive (HDD) device to have multiple disks and multiple read-write heads (or simply "heads"). Data stored on an HDD can be located in different locations or radii of the disk and across different heads. Seek operations, or "seeks", are used to access these different areas of a disk stack. Generally, a seek involves moving the arm and associated suspension assembly that carries the read-write head slider to, and settling the head over, the correct desired disk track so that a data transfer (i.e., a read operation or a write operation) may occur. Because the disk tracks are not aligned among the various heads, head switching is a special class of seeks.

As discussed, regardless of the operation for which TFC power may be applied, the TFC heater element has an associated time constant over which the desired slider bulge is generated. A head may be pre-heated prior to arrival at its seek target, such as to minimize the time that the flying height is at its optimal temperature in order to maximize head performance over time. Because the servo bursts are typically written at a lower frequency than the frequency at which user data is written, servo data may be read without TFC assistance. Furthermore, utilizing what is at times referred to as "servo TFC" or "seek TFC" (in either case, "STFC") a head may be heated just to the level needed to read higher frequency servo bursts for positioning purposes. Because the servo bursts are typically written at a lower frequency than the frequency at which user data is written, STFC power is lower than the power and heat needed for read and write operations. But regardless of the purpose of and the level of TFC power applied to a head, historically only one head is heated at a time during normal user operation.

Figure 2:
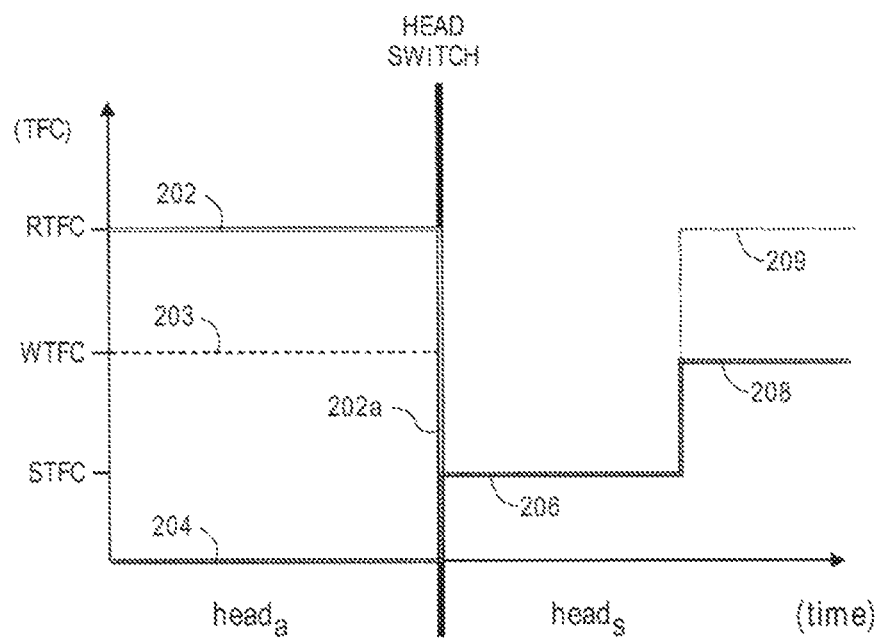
FIG. 2 is a diagram illustrating a conventional approach to managing the thermal flying height control (TFC) power in the context of a head switch process.

FIG. 2 is a diagram illustrating a conventional approach to managing the thermal flying height control (TFC) power in the context of a head switch process. FIG. 2 depicts a graph showing time (x-axis) versus TFC power (y-axis), for a first read-write head slider (head$_a$, the "active" head) and a second read-write head slider (head$_s$, the "switched-to" head), separated by a vertical line representing a head switch event. The head switch event line represents when voice coil actuator control and data channel control switch from head$_a$ to head$_s$. Along the TFC axis are shown a mark corresponding to each of STFC power, WTFC power (write TFC), and RTFC power (read TFC). While the respective locations along the TFC axis are not intended to be shown to scale, typically the RTFC power exceeds the WTFC power which exceeds the STFC power.

At an arbitrary point in time the active head (head$_a$) is depicted as performing a data operation which, in this example, is a read operation. Therefore, the active head is depicted as having RTFC power 202 applied, as illustrated by the horizontal line along the RTFC power level. Alternatively, the active head could be performing a write operation, with WTFC power 203 applied, as illustrated by the dashed horizontal line along the WTFC power level. Regardless of whether head$_a$ is performing a read operation with RTFC power 202 applied or a write operation with WTFC power 203 applied, head$_s$ is "cold", with no TFC power applied, as illustrated by the hashed horizontal line at TFC zero power 204.

At the time of head switching, illustrated as the bold vertical line between head$_a$ and head$_s$, the TFC power is removed from head$_a$ and applied to head$_s$. Thus, the head$_a$ TFC power line drops to zero, as illustrated by the vertical portion 202a of RTFC power 202. The switched-to head (head$_s$) becomes the active head at head switching time, a time at which the voice coil actuator control and data channel switches from head$_a$ to head$_s$ and a head$_s$ seek can begin. Thus, at head switching time some TFC power is applied to the now active head, head$_s$, which in this example is depicted as a rise to STFC power 206. As discussed, STFC power 206 is enough TFC power to cause a sufficient bulge in the head$_s$ slider in order to adjust the head$_s$ flying height so that it can read the low frequency servo burst data. However, because a certain amount of time is required for a sufficient bulge to form in the head after applying TFC power, a seek and/or the next read or write operation is not immediately possible, which may negatively impact the HDD performance.

Upon completion of the seek and arrival and settling at the desired area of the disk, additional TFC power is applied to head$_s$ in order to perform the relevant data operation. In this example, the head$_s$ data operation is depicted as a write operation for which WTFC power 208 is applied to head$_s$, as illustrated by the vertical line to and horizontal line along the WTFC power level. Alternatively, head$_s$ could be performing a read operation, with RTFC power 209 applied, as illustrated by the hashed vertical line to and horizontal line along the RTFC power level.

In summary, at least one point that FIG. 2 depicts is that the TFC power regime associated with a head switch seek only provides for applying power, and thus heating, one head slider at a time. Consequently, there could be some delay associated with preparing the switched-to head (head$_s$) for performing a data operation, including the corresponding seek involved. One possible scenario prohibiting the capability to apply TFC power and heat to multiple heads simultaneously may reside with preamplifier architectures, for example.

Method for Managing the Flying Height of a Read-Write Head Slider

Figure 4:
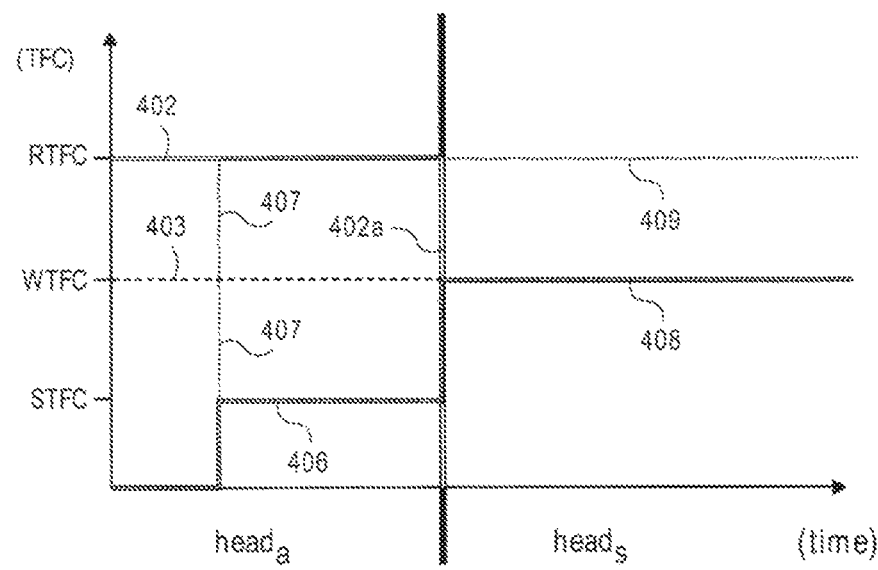
FIG. 4 is a diagram illustrating an approach to managing the thermal flying height control (TFC) power in the context of a head switch process, according to an embodiment.
Figure 3:
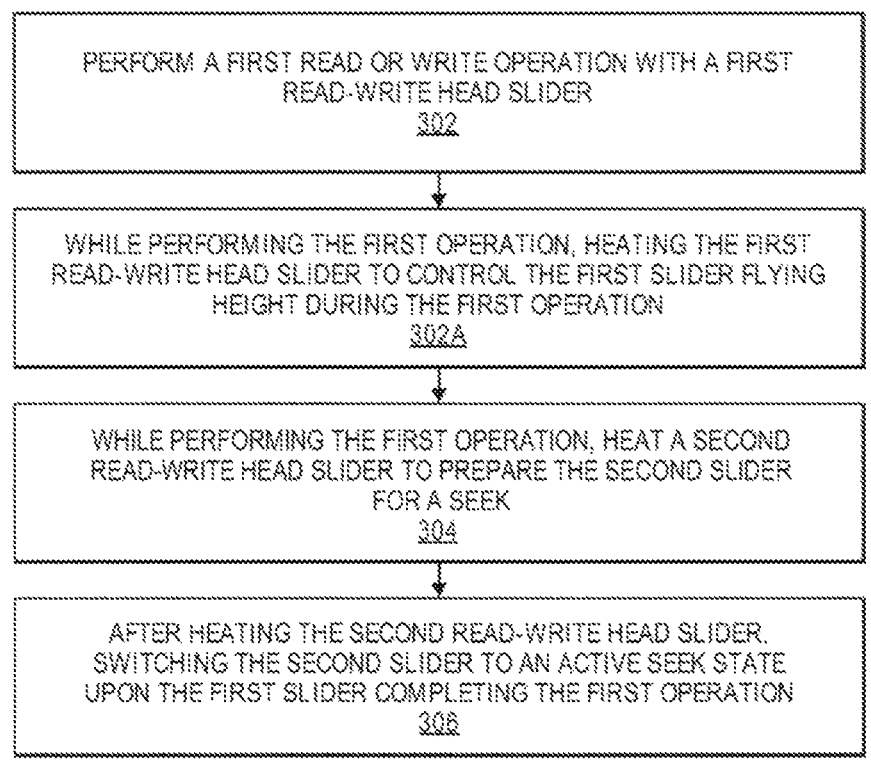
FIG. 3 is a flow diagram illustrating a method for managing the flying height of a read-write head slider, according to an embodiment.

FIG. 3 is a flow diagram illustrating a method for managing the flying height of a read-write head slider, according to an embodiment. The process described in reference to FIG. 3 may be performed by a hard disk drive, for example. Further, portions of the process described in reference to FIG. 3 may be performed by an electronic component including control circuitry, such as a preamplifier, for a non-limiting example. Hereafter, FIG. 4 illustrates an example that may correspond with the method described in reference to FIG. 3.

At block 302, a first read operation or write operation (i.e., a data operation) is performed with a first read-write head slider. At block 302A, while performing the first operation the first read-write head slider is heated, to control the first slider flying height during the first operation. For example, an active head such as head$_a$ (FIG. 2) may be performing a read operation with an RTFC power 202 applied.

At block 304, while performing the first operation a second read-write head slider is heated, to prepare the second slider for performing a second read or write operation. For example, a switched-to head such as head$_s$ (FIG. 2) may be preheated (also referred to herein as "early TFC" or "ETFC") with an STFC power 406 (FIG. 4) applied, or even with a WTFC 408 (FIG. 4) or RTFC 409 (FIG. 4) applied. Notably, and different from the TFC power regime depicted in FIG. 2, TFC power is applied to the second head slider while the first head slider is performing a data operation and, thus, at the same time that TFC power is applied to the first head slider.

At block 306, after heating the second read-write head slider (block 304) the second head slider is switched to an active seek state upon the first slider completing the first operation. Consequently, because the second head slider has been preheated while the first head slider was completing its data operation, the second slider is in a better condition or state for completing its seek, and/or read or write operation, once control is switched from the first slider to the second slider, as compared to a scenario in which the second head slider cannot be heated at all until control has switched.

FIG. 4 is a diagram illustrating an approach to managing the thermal flying height control (TFC) power in the context of a head switch process, according to an embodiment. Similarly to FIG. 2, FIG. 4 depicts a graph showing time (x-axis) versus TFC power (y-axis), for a first read-write head slider (head$_a$, the "active" head) and a second read-write head slider (head$_s$, the "switched-to" head), separated by a vertical line representing a head switch event. The head switch event line represents when voice coil actuator control and data channel control switch from head$_a$ to head$_s$. Along the TFC axis are shown a mark corresponding to each of STFC power, WTFC power (write TFC), and RTFC power (read TFC). While the respective locations along the TFC axis are not intended to be shown to scale, typically the RTFC power exceeds the WTFC power, which exceeds the STFC power.

At an arbitrary point in time the active head (head$_a$) is depicted as performing a data operation which, in this example, is a read operation. Therefore, the active head is depicted as having RTFC power 402 applied, as illustrated by the horizontal line along the RTFC power level. Alternatively, the active head could be performing a write operation, with WTFC power 403 applied, as illustrated by the dashed horizontal line along the WTFC power level. Regardless of whether head$_a$ is performing a read operation with RTFC power 402 applied or a write operation with WTFC power 403 applied, head$_s$ is already "hot", with TFC power applied to head$_s$ and to head$_a$ simultaneously, as illustrated by the overlap of hashed horizontal line at STFC power 406 for head$_s$ and the horizontal line along RTFC representing RTFC power 402 applied to head$_a$. Alternatively to the application of STFC power 406 to head$_s$, additional TFC power may be applied to head$_s$ prior to switching, such as to the level of WTFC or RTFC, as illustrated by the dotted vertical line rising to the RTFC power 407 level, for example.

At the time of head switching, illustrated as the bold vertical line between head$_a$ and head$_s$, the TFC power is removed from head$_a$ and the head$_a$ TFC power line drops to zero, as illustrated by the vertical portion 402a of RTFC power 402. For example, a head select register in the preamplifier may be programmed to the head$_s$, whereby head$_s$ becomes the active head at head switching time, a time at which the voice coil actuator control and data channel switches from head$_a$ to head$_s$ and a head$_s$ seek can begin based on the servo data that head$_s$ has previously read from the disk during the ETFC stage. Thus, at head switching time some additional TFC power may be applied to the now active head, head$_s$, which in this example is depicted as a rise to WTFC power 408. Consequently, upon completion of the seek and arrival and settling at the desired area of the disk, head$_s$ is prepared and ready to perform the relevant data operation. In this example, the head$_s$ data operation is depicted as a write operation for which WTFC power 408 is applied to head$_s$, as illustrated by the vertical line to and horizontal line along the WTFC power level. Alternatively, head$_s$ could be performing a read operation, with RTFC power 409 applied, as illustrated by the hashed vertical line to and horizontal line along the RTFC power level.

At least one point that FIG. 4 depicts is that the TFC power regime associated with, for example a short seek and/or head switch seek, according to an embodiment, provides for applying power and thus heating to two (or more) head sliders simultaneously. Consequently, delay associated with preparing the switched-to head (head$_s$) for performing a data operation, including the corresponding seek involved, is inhibited and/or reduced.

The manner in which the described embodiments are implemented may vary from implementation to implementation. For example, preamplifier integrated circuit architecture may be modified to implement embodiments. Furthermore, embodiments may rely on existing servo heat registers corresponding to TFC power levels that are typically utilized during manufacturing for servo write mode, to store TFC power levels for the ETFC modes described herein.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A method for managing the flying height of a read-write head slider, the method comprising:
    performing a first user data read or write operation with a first read-write head slider; and
    while performing said first operation, heating a second read-write head slider to prepare said second slider for a seek.

2. The method of claim 1, further comprising:
    while performing said first operation, heating said first read-write head slider to control the first slider flying height during said first operation.

3. The method of claim 1, further comprising:
    after heating said second read-write head slider, switching said second slider to an active seek state upon said first slider completing said first operation.

4. The method of claim 1, wherein heating said second read-write head slider includes applying a particular amount of power to said second slider to control the second slider flying height to enable said second slider to read a positioning servo burst.

5. The method of claim 1, wherein heating said second read-write head slider includes applying a particular amount of power to said second slider to control the second slider flying height to prepare said second slider to perform a write operation.

6. The method of claim 1, wherein heating said second read-write head slider includes applying a particular amount of power to said second slider to control the second slider flying height to prepare said second slider to perform a read operation.

7. A hard disk drive control circuit comprising one or more sequences of instructions which, when executed by one or more processors, cause performance of:
　while performing a first user data read or write operation with a first read-write head slider, heating a second read-write head slider to prepare said second slider for a seek.

8. The hard disk drive control circuit of claim 7, said one or more sequences of instructions which, when executed by one or more processors, cause performance of:
　while performing said first operation, heating said first read-write head slider to control the first slider flying height during said first operation.

9. The hard disk drive control circuit of claim 7, said one or more sequences of instructions which, when executed by one or more processors, cause performance of:
　after heating said second read-write head slider, switching said second slider to an active seek state upon said first slider completing said first operation.

10. The hard disk drive control circuit of claim 7, wherein heating said second read-write head slider includes applying a particular amount of power to said second slider to control the second slider flying height to enable said second slider to read a positioning servo burst.

11. The hard disk drive control circuit of claim 7, wherein heating said second read-write head slider includes applying a particular amount of power to said second slider to control the second slider flying height to prepare said second slider to perform a write operation.

12. The hard disk drive control circuit of claim 7, wherein heating said second read-write head slider includes applying a particular amount of power to said second slider to control the second slider flying height to prepare said second slider to perform a read operation.

13. A hard disk drive comprising:
　a recording disk medium rotatably mounted on a spindle;
　a read-write head slider comprising a read-write transducer configured to read from and to write to said disk medium;
　a voice coil actuator configured to move said head slider to access portions of said disk medium; and
　at least one control circuit comprising one or more sequences of instructions which, when executed by one or more processors, cause performance of:
　　while performing a first user data read or write operation with a first read-write head slider, heating a second read-write head slider to prepare said second slider for a seek.

14. The hard disk drive of claim 13, said one or more sequences of instructions which, when executed by one or more processors, cause performance of:
　while performing said first operation, heating said first read-write head slider to control the first slider flying height during said first operation.

15. The hard disk drive of claim 13, said one or more sequences of instructions which, when executed by one or more processors, cause performance of:
　after heating said second read-write head slider, switching said second slider to an active seek state upon said first slider completing said first operation.

16. The hard disk drive of claim 13, wherein heating said second read-write head slider includes applying a particular amount of power to said second slider to control the second slider flying height to enable said second slider to read a positioning servo burst.

17. The hard disk drive of claim 13, wherein heating said second read-write head slider includes applying a particular amount of power to said second slider to control the second slider flying height to prepare said second slider to perform a write operation.

18. The hard disk drive of claim 13, wherein heating said second read-write head slider includes applying a particular amount of power to said second slider to control the second slider flying height to prepare said second slider to perform a read operation.

* * * * *